United States Patent [19]

Asaida

[11] Patent Number: 4,520,386
[45] Date of Patent: May 28, 1985

[54] COLOR VIDEO SIGNAL PROCESSING APPARATUS

[75] Inventor: Takashi Asaida, Atsugi, Japan
[73] Assignee: Sony Corporation, Tokyo, Japan
[21] Appl. No.: 391,992
[22] Filed: Jun. 25, 1982
[30] Foreign Application Priority Data Jun. 30, 1981 [JP] Japan .................................. 56-101689

[51] Int. Cl.³ .............................................. H04N 9/32
[52] U.S. Cl. ..................................................... 358/13
[58] Field of Search ............................................. 358/13

[56] References Cited
U.S. PATENT DOCUMENTS

Re. 30,800 11/1981 Yamanaka .............................. 358/44
4,438,452 3/1984 Powers ................................... 358/13

Primary Examiner—Richard Murray
Attorney, Agent, or Firm—Hill, Van Santen, Steadman & Simpson

[57] ABSTRACT

A color video signal processing apparatus which utilizes a digital luminance data and first and second color difference signals which are digitized at a first sampling frequency and formed by matrix operation wherein at least one of the first or second color difference data is sampled at a second sampling frequency which comprises the first sampling frequency divided by an integer with the band width of the sample output being limited to a predetermined band width with a digital filter and the luminance and first and second color difference signals which have had their band width limited comprising the color video signal which is to be transmitted.

7 Claims, 28 Drawing Figures

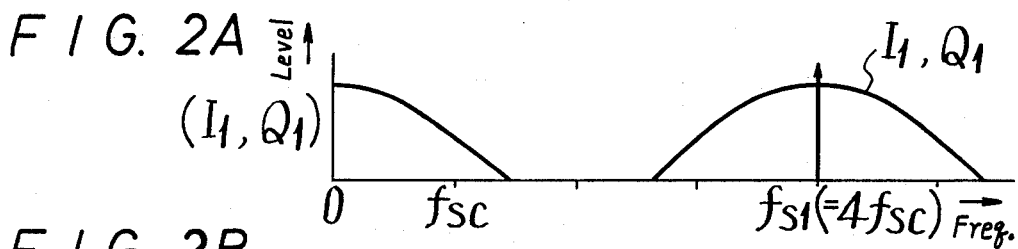
FIG. 2A ($I_1, Q_1$)
FIG. 2B ($F_1$)
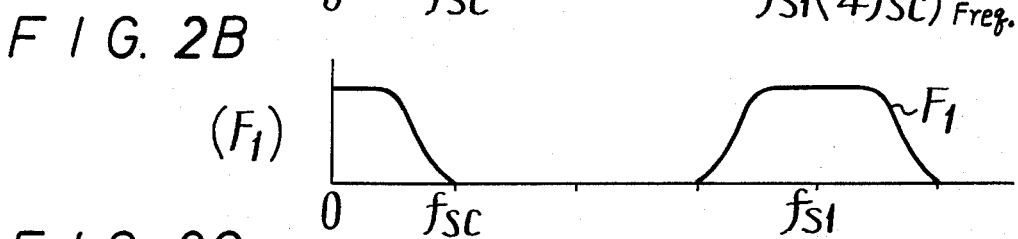
FIG. 2C ($I_2, Q_2$)
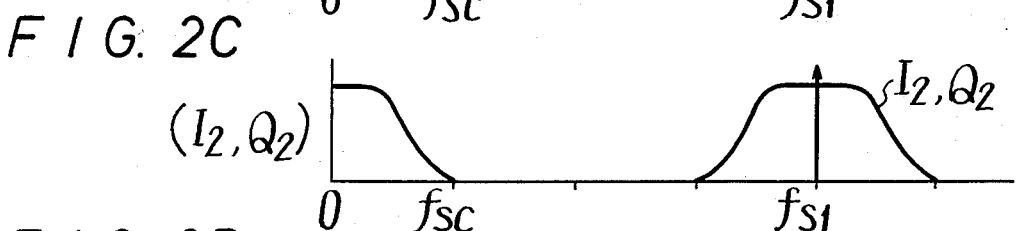
FIG. 2D ($I_3, Q_3$)
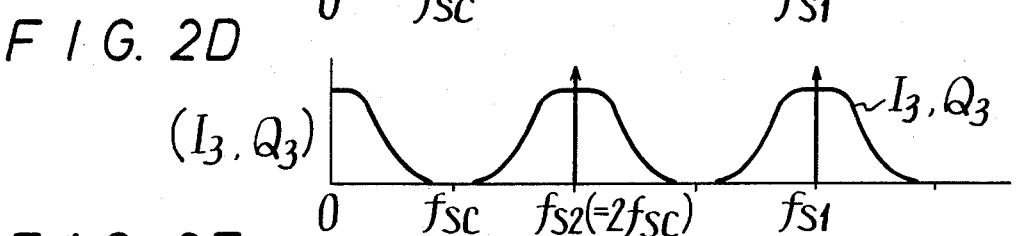
FIG. 2E ($F_{2I}$, $F_{2Q}$)
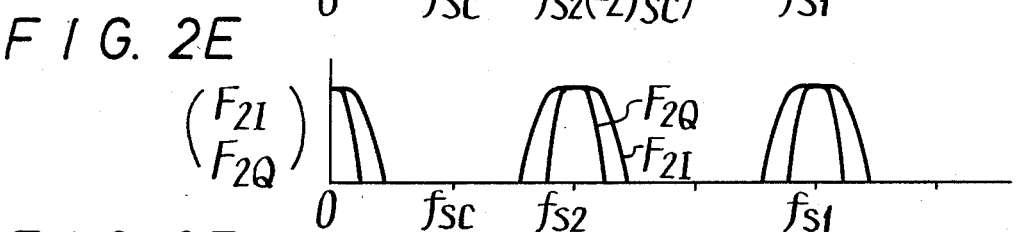
FIG. 2F ($I_4, Q_4$)
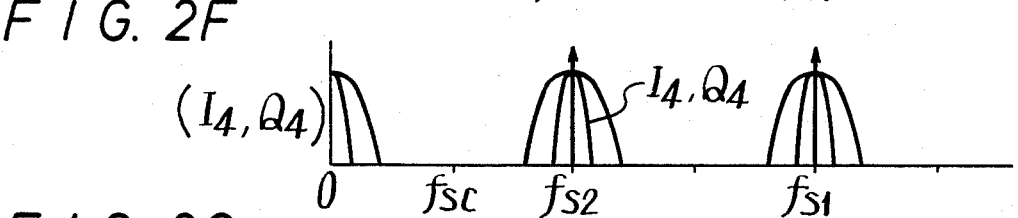
FIG. 2G ($I_1, Q_1$ / $I_3, Q_3$)
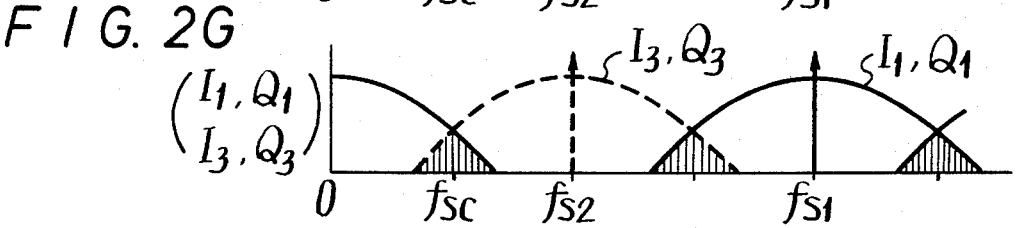

FIG. 9A ($I_1, Q_1$)
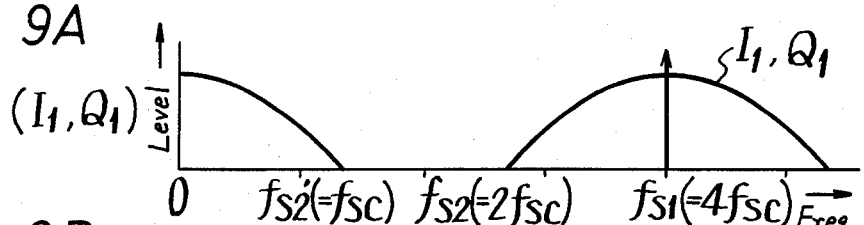
FIG. 9B ($F_1$)
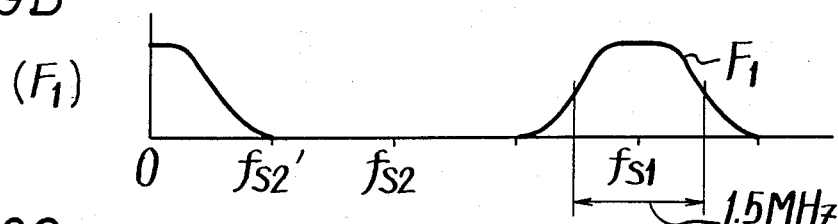
FIG. 9C ($I_2, Q_2$)
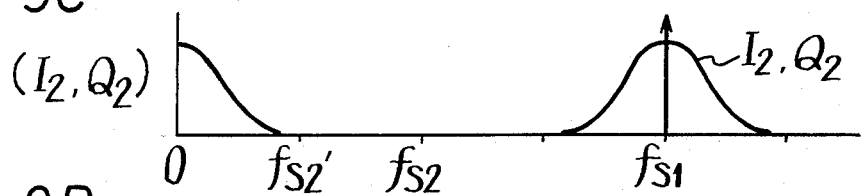
FIG. 9D ($I_3$)
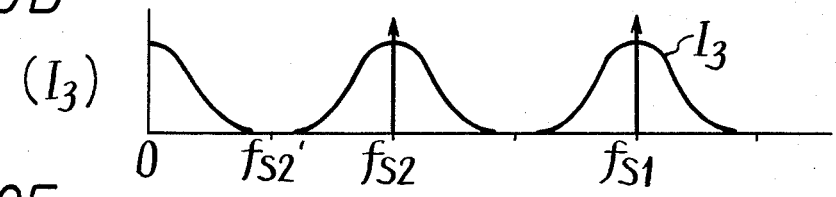
FIG. 9E ($Q_3$)
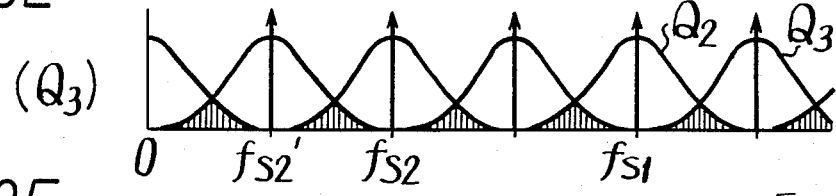
FIG. 9F ($F_{2Q}$)
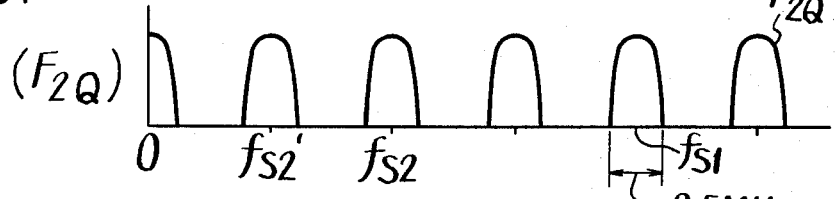
FIG. 9G ($Q_4$)
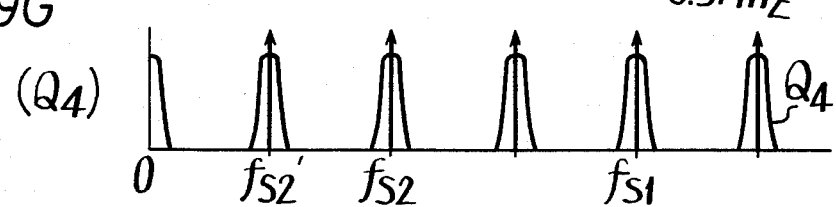

($F_{3I}$)

($I_5$)

($F_{3Q}$)

($Q_5$)

($I_5, Q_5$)

4,520,386

COLOR VIDEO SIGNAL PROCESSING APPARATUS

BACKGROUND OF THE INVENTION

1. Field of the Invention

This invention relates in general to a color video signal processing apparatus which forms color difference signals from a color signal in digital fashion.

2. Description of the Prior Art

It has become desirable to utilize and transmit digitized color video signals.

SUMMARY OF THE INVENTION

When color video signals obtained from color images are converted to digital color difference signals, it is desirable to limit the color signals and band width by digital low pass filters.

In general, the color signal will have a band width between 0 to 4 MHz and its band width can be restricted to some degree without degrading the signal. For instance, the signals I and Q are transmitted with band widths of 1.5 MHz and 0.5 MHz respectively. With digital low pass filters the smaller the ratio of $f_c/f_s$ where $f_c$ is a cut-off frequency and $f_s$ is the driving clock frequency, the more complex the transfer function will be. Thus, when this ratio is small, the circuit arrangement will be complicated because of the higher order of the filter. As the sampling frequency for the color video signal when it is digitized generally $3f_{sc}$ or $4f_{sc}$ where $f_{sc}$ represents a color subcarrier frequency is utilized. For this reason, it has presented a problem because the frequency ratio $f_c/f_s$ is so small.

The Nyquist signals for the signals I and Q are 1 MHz and 3 MHz, respectively, and it is not necessary to transmit data at the sampling frequency of $4f_{sc}$ which is nearly equal to 14.3 MHz.

It is an object of the present invention to simplify the arrangement of the digital filters used for limiting the band width in color video systems and also to enable the suitable sampling frequency to be selected for the band width of the signal which is to be transmitted.

Other objects, features and advantages of the invention will become apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIGS. 2A through 2G illustrate the frequency spectrums of the transmitter;

FIGS. 9A through 9G illustrate frequency spectrums for explaining the invention.

DESCRIPTION OF THE PREFERRED EMBODIMENTS

Figure 1:
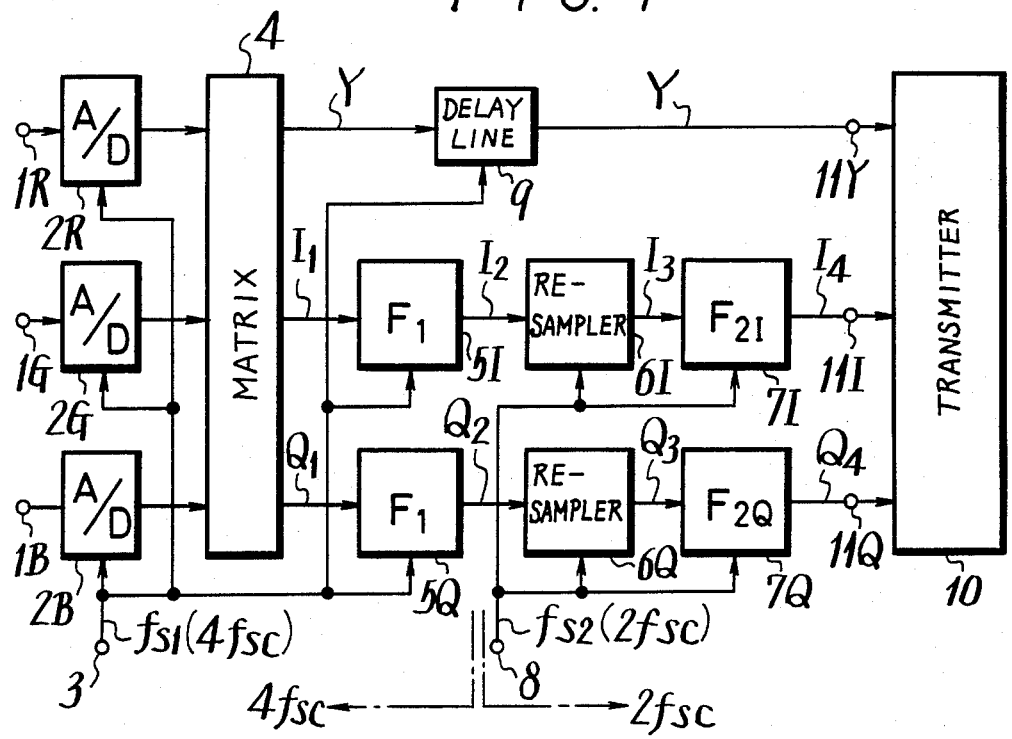
FIG. 1 is a block circuit diagram schematically illustrated in the example of the transmitter of the color video signal processing apparatus according to the invention.

FIG. 1 illustrates a first embodiment of a transmitter of the invention in which a color video signal is transmitted under the conditions where it is divided into components of a luminance signal Y and first and second color difference data signals I and Q.

The input terminals 1R, 1G and 1B, respectively, receive a red signal R, a green signal G, and a blue signal B which are respectively supplied to analog to digital converters 2R, 2G and 2B wherein they are digitized. The converters A/D 2R, 2G and 2B each receive a sampling clock frequency of $f_{s1}$ which is equal to $4f_{sc}$ which is applied at a terminal 3. Red, green and blue data provided at the outputs of the A/D converters 2R, 2G and 2B are supplied to a matrix circuit 4 which produces luminance data signal Y and color difference data signals $I_1$ and $Q_1$. It is to be realized of course, that the matrix 4 could receive the signals from the input terminals 1R, 1G and 1B and then after the signals are formed into luminance and $I_1$ and $Q_1$ signals, these signals could be digitized.

FIG. 2A illustrates the frequency band of the color difference data signals $I_1$ and $Q_1$ which are derived at the output of the matrix circuit 4.

The color difference data signals $I_1$ and $Q_1$ are respectively supplied to digital filters 5I and 5Q and these digital filters have filter characteristics of F1. The output of the digital filters 5I and 5Q operate with a sampling clock frequency of $f_{s1}$ which is used as the pre-filter for the re-sampling operation for the next stage and the filter characteristics $F_1$ is illustrated in FIG. 2B. Each of the digital filters is utilized so as to limit the band width so as to avoid the generation of aliasing noise during re-sampling and the filter characteristics $F_1$ is determined by considering the clock frequency $f_{s2}$ (for instance, $2f_{sc}$) which is used in the re-sampling operation and which is supplied to each of the re-sampling circuits from terminal 8. In the example, the filter characteristic $F_1$ is selected so as to have a pass band from 0 to 1.5 MHz and also to have a stop band from $f_{s2}$ to $f_{s2}-1.5$ MHz. In other words, when the color difference data signals are not passed through the pre-filters 5I and 5Q, sampling side band signals $I_3$ and $Q_3$ each centered at $2f_{sc}$, and the original signals $I_1$ and $Q_1$ will be superimposed on each other during the re-sampling operation as is illustrated by hatching in FIG. 2G, thus, causing aliasing noise. As the frequency for the re-sampling operation, frequenices which are sufficient to satisfy the Nyquist conditions relative to the signals I and Q are used.

The re-sampling circuits 6I and 6Q produce outputs of color difference data signals $I_3$ and $Q_3$ each which has a frequency distribution which is some integer times the base band and the sampling frequency $f_{s2}$ as its center frequency as illustrated in FIG. 2D.

The color difference data signals $I_3$ and $Q_3$ are, respectively, supplied to digital filters 7I and 7Q which operate with a clock frequency $f_{s2}$ and these filters have filter characteristics $F_{2I}$ and $F_{2Q}$ as illustrated in FIG.

2E. The filter characteristic $F_{2I}$ has a pass band ranging from 0 to 1.5 MHz and the filter characteristic $F_{2Q}$ has a pass band from 0 to 0.5 MHz. At the outputs of the digital filters 7I and 7Q, there would appear color difference data signals $I_4$ and $Q_4$ which are illustrated in FIG. 2F which have standardized frequency distributions as determined by the filter characteristics $F_1$, $F_{2I}$ and $F_{2Q}$.

So as to compensate for time delays caused by the processing of the color data difference signals through the digital filters there is provided a delay circuit 9 which may be a shift register or other device in the transmission of the luminance data signal Y. The luminance data signal Y and the color difference signals $I_4$ and $Q_4$ are supplied to input terminals 11Y, 11I and 11Q of a transmitter 10 such as a digital VTR (video tape recorder), a switcher or the like where they are recorded on a magnetic tape. The digital VTR which is one example of the transmitter 10 may be for instance a rotary head type which records the luminance data Y and the color difference data signals $I_4$ and $Q_4$ on the magnetic tape in a plurality of parallel/tracks.

Figure 5:
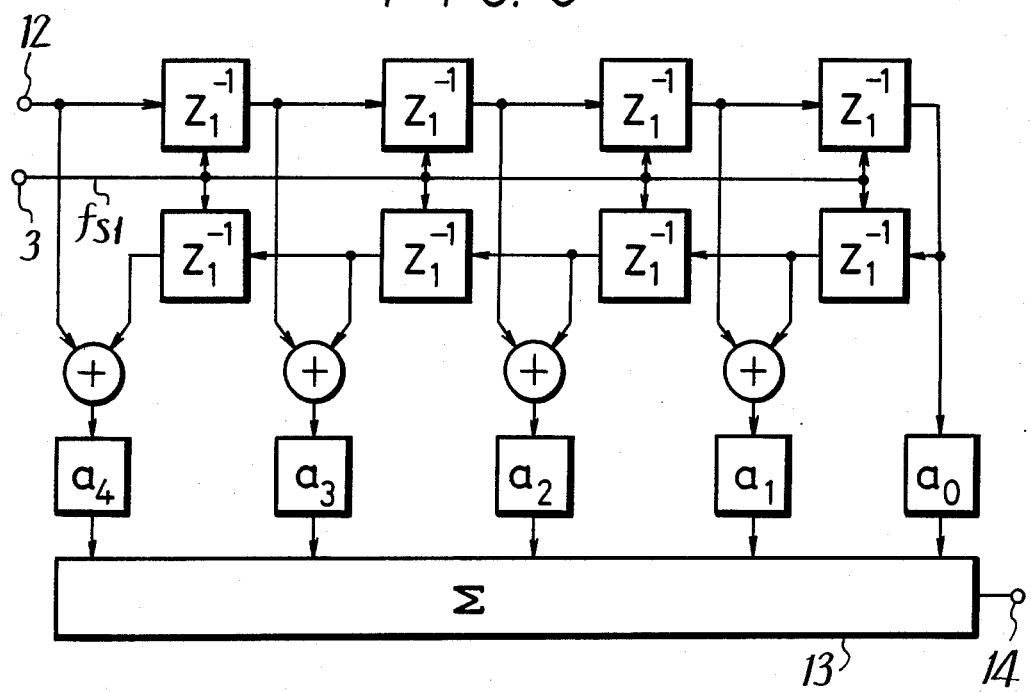
FIG. 5 illustrates in block diagram form a digital filter for the invention.

Each of the frequency digital filters 5I and 5Q is of the non-recursive type filter, for example, a finite impulse response (FIR) type. FIG. 5 illustrates one example of such a filter which operates at a clock frequency $f_{s1}$ and it is constructed with delay elements connected in cascade to delay the color difference data signal by $1/4f_{sc}$ and the color difference data signal is supplied to an input terminal 12 which is connected to one end of the cascaded delay elements. Outputs from the predetermined stages are supplied to adders where they are digitally added to each other and the added outputs are multiplied by a coefficient $a_0$ through $a_9$ in multipliers and then supplied to a digital adder 13. The output is removed at the output terminal 14 of the adder 13. By setting the number of connection stages of the delay elements and the impulse response coefficients $a_0$ through $a_9$ to appropriate values, the filter characteristic $F_1$ illustrated in FIG. 2B is obtained.

Figure 6:
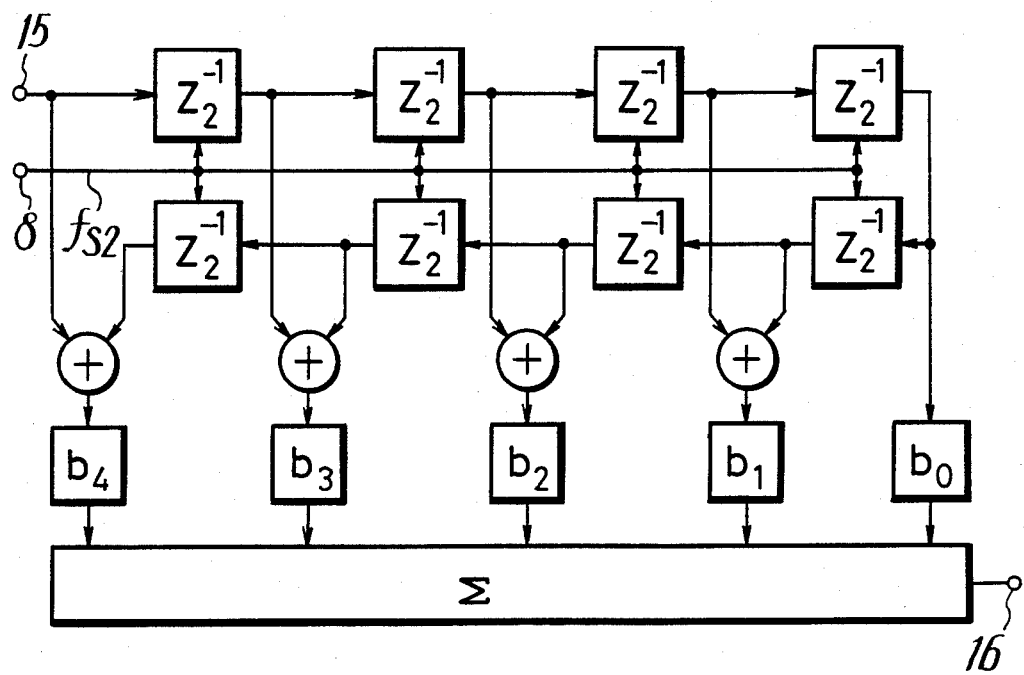
FIG. 6 illustrates a block diagram of a digital filter.

FIG. 6 illustrates the digital filter 7I which is of the non-recursive type of the finite impulse response (FIR) which includes an input terminal 15 and an output terminal 16. Delay elements are connected in cascade to the input terminal 15 and operate at a clock frequency of $f_{s2}$ which is equal to $2f_{sc}$ and have a unit delay time of $1/2f_{sc}$. Each of the delay elements of the digital filter 7I is constructed so as to satisfy the relationship of the digital filters 5I and 5Q such that the operators are respectively selected as $Z_1$ and $Z_2$ with $Z_2$ being equal to $Z_1^2$ ($Z_2=Z_1^2$). By selecting the specific number of the connection stages of the delay elements and the impulse response coefficients of $b_0$ through $b_9$ produces the filter characteristic $F_{2I}$ illustrated in FIG. 2E. The digital filter 7Q is constructed as illustrated in FIG. 6 and the output of the coefficient multipliers $b_0$ through $b_4$ are supplied to the adder which has an output terminal 16.

Figure 3:
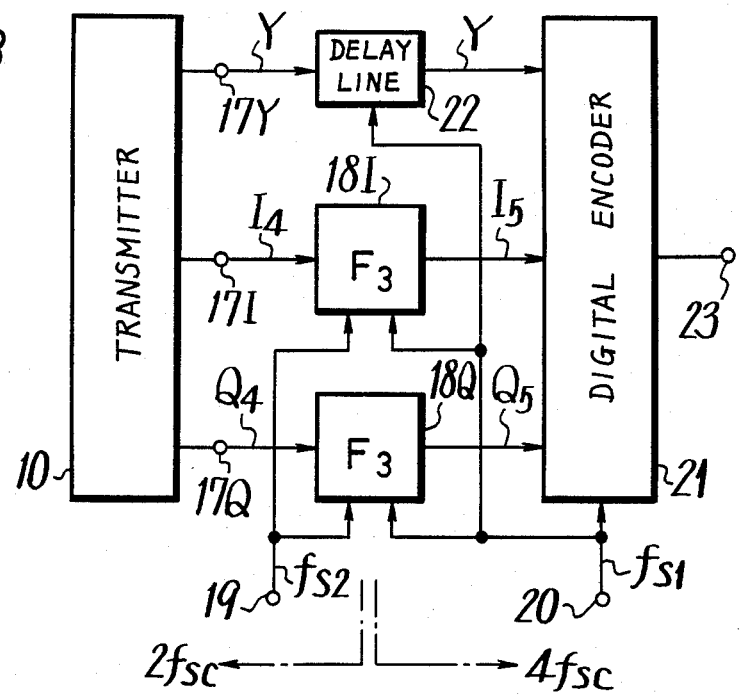
FIG. 3 comprises a block diagram illustrating the receiver of the color video signal processing apparatus according to the invention.
Figure 4A:
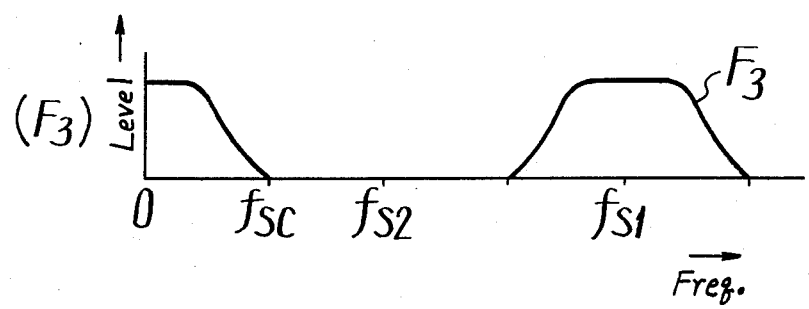
FIGS. 4A through 4C illustrate the frequency spectrums for explaining to the invention.
Figure 4B:
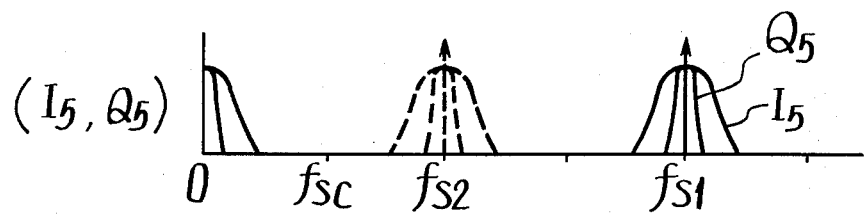

FIG. 3 illustrates the output of the transmitter 10 which is applied to terminals 17Y, 17I and 17Q which respectively receive the luminance data Y and the color difference data signals $I_4$ and $Q_4$. The color difference data signals $I_4$ and $Q_4$ are illustrated in FIG. 2F and are applied to interpolation filters 18I and 18Q respectively. The interpolation filters 18I and 18Q each receive from terminal 19 a clock frequency $f_{s2}$ which is synchronized with the input data. The filters 18I and 18Q also receive from terminal 20 the clock frequency $f_{s1}$ and the sampling rate of the input data is converted from $f_{s2}$ to $f_{s1}$. Both of the interpolation filters 18I and 18Q have a filter characteristic $F_3$ illustrated in FIG. 4A. Thus, the interpolation filters 18I and 18Q each produce at their output terminals color difference data signals $I_5$ and $Q_5$ illustrated in FIG. 4B and these are supplied to a digital encoder 21. The digital encoder 21 is also supplied with a luminance data signal Y which has been passed through a delay circuit 22 and a digitized composite color video signal is produced at the output of the decoder 21 and applied to its output terminal 23. The digital encoder 21 performs the addition of sync and burst signals and the digital modulation of two color different data signals $I_5$ and $Q_5$. Since the sampling rate for each of the color difference data signals is converted from $f_{s2}$ to $f_{s1}$ by the interpolation filters 18I and 18Q in the previous stages the digital encoder 21 utilizes a clock frequency $f_{s1}$ for data processing.

Figure 4C:
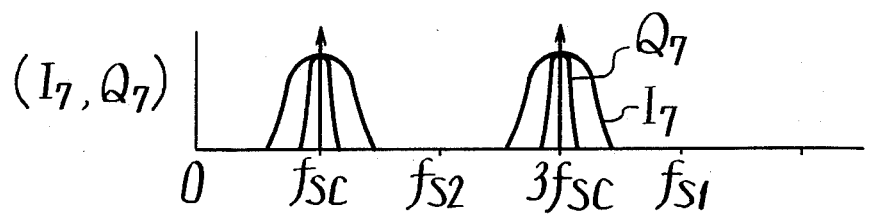

The modulation of the two color difference data signals utilizes an orthogonal two phase modulation which employs the carrier at a frequency of $f_{sc}$. The color difference data signals $I_7$ and $Q_7$ appear at the output of the digital encoder 21 and have band widths of 0.5 MHz and 1.5 MHz as illustrated in FIG. 4C.

The one-dot chain lines in FIGS. 1 and 3 illustrate that the processing rates of the chroma signals are changed in the transmitter for example from $4f_{sc}$ to $2f_{sc}$ as illustrated in FIG. 1 and from $2f_{sc}$ to $4f_{sc}$ as illustrated in FIG. 3. The emission of the digital filter 7I having a relatively broad band width may be possible wherein the pre-filter 5I can serve such purpose. In this case, it may be sufficient to accomplish re-sampling for the rate conversion only.

Figure 7:
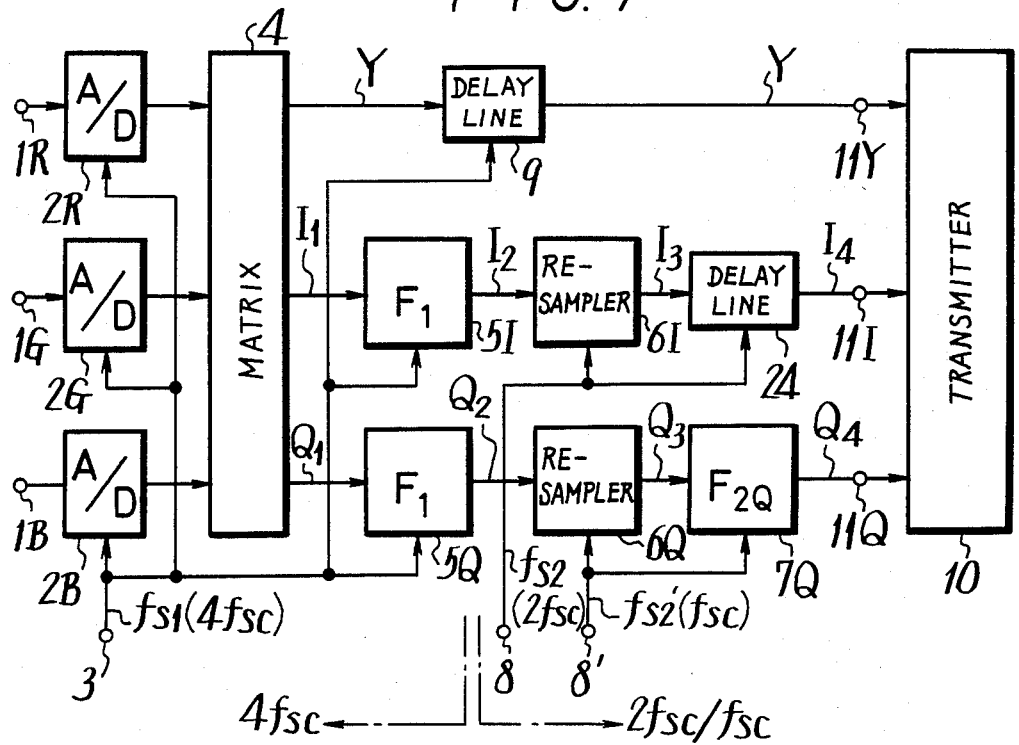
FIG. 7 comprises a block diagram of another embodiment of the transmitter of the invention.
Figure 8:
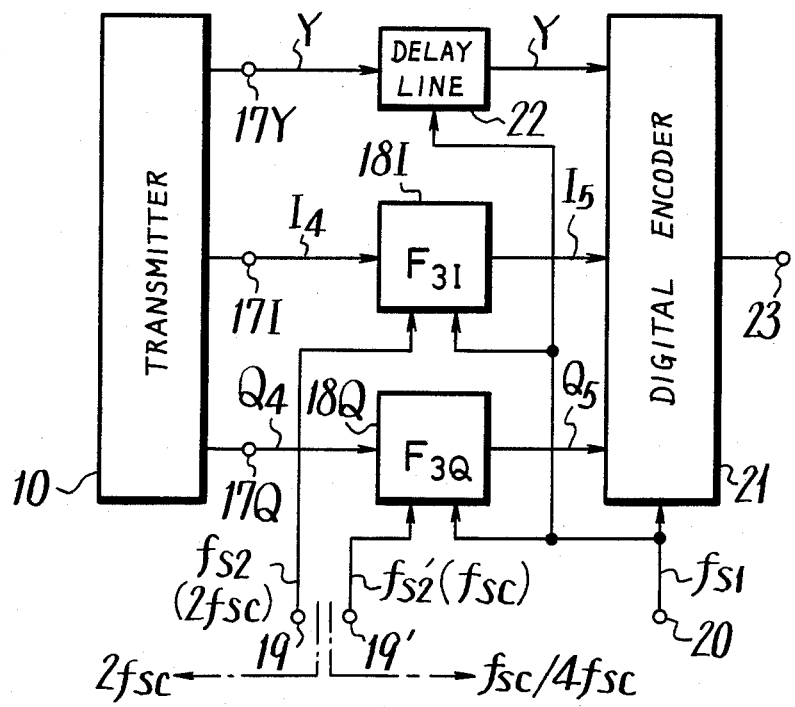
FIG. 8 is a block diagram illustrating another example of the receiver according to the invention.

FIGS. 7 and 8 illustrate another embodiment of the transmitter and receiving portions of the apparatus.

In the transmitter of FIG. 7, wherein like elements similar to those in FIG. 1 are designated by the same numerals, the sampling rate of $f_{s1}$ which is equal to $4f_{sc}$ for the color difference data signals $I_1$ and $Q_1$ which each have a band width as illustrated in FIG. 9A are supplied to the digital filters 5I and 5Q which each have a filter characteristic $F_1$ with a pass band of 1.5 MHz as illustrated in FIG. 9B to re-sampling circuits 6I and 6Q. The sampling frequency utilized in the re-sampling operation is different for the two color difference data signals. The color difference data signal $I_2$ from the digital filter 5I is re-sampled at a clock frequency of $f_{s2}$ which equals to $2f_{sc}$ which is obtained at terminal 8 and the color difference data signal $Q_2$ from the digital filter 5Q is re-sampled by a clock signal of $f_{s2}'$ which is equal to $f_{sc}$ which is obtained from a terminal 8'. As shown in FIG. 9C, the color difference data signals $I_2$ and $Q_2$ which have had their band widths converted to 1.5 MHz are changed by the re-sampling operation into color difference data signals $I_3$ and $Q_3$ illustrated in FIGS. 9D and 9E respectively. In this example, the sampling side band produced by the re-sampling operation is superimposed upon the original signals, thus causing the aliasing noise which is illustrated by hatching in FIG. 9E.

Since the band frequencies of the color difference data signal $I_3$ derived from the re-sampling circuit 6I has already been converted to a predetermined band of 1.5 MHz by the digital filter 5I, it is supplied through a delay circuit 24 to the input terminal 11I of the transmitter 10. The color difference data signal $Q_3$ obtained from the re-sampling circuit $Q_6$ is supplied to the digital filter 7Q. The digital filter 7Q operates at a clock signal $f_{s2}'$ received from the terminal 8' and has the filter characteristic $F_{2Q}$ with a pass band of 0.5 MHz as illustrated in FIG. 9F. Thus, the digital filter 7Q produces at its output the color difference data signal $Q_4$ in which the aliasing noise illustrated in FIG. 9E has been eliminated and which has a band of frequencies which is limited as shown in FIG. 9G. The luminance data signal Y and the color difference data signals $I_4$ and $Q_4$ are transmitted by the transmitter 10.

The reason that different sampling frequencies are used in the re-sampling operation for the two color different signals is as follows. Since it is sufficient that the overall filter characteristics of the filter to pass the color difference data $I_2$ be broader than that of the filter for passing the color difference data $Q_2$ and since the band width of the data $I_2$ is relatively broad, the pre-filter 5I may serve alone for this purpose. If the clock rate of the resampling circuit 6I is selected to be low ($f_{sc}$) and the same as the re-sampling circuit 6Q, the output from the re-sampling circuit 6I will produce the same spectrum illustrated in FIG. 9E. Thus, it becomes impossible to transmit the color difference signal I with the broad band of 1.5 MHz band width with the aliasing noise removed.

In general, since the color difference signal Q is originally sufficient to have a narrow band of 0.5 MHz, it is desired that the filter 7Q having an abrupt filter characteristic be constructed first and then the necessary band width is selected. Such filter with abrupt filter characteristic is operable with a driving clock of sufficiently low frequency $f_{sc}$ so that it can be easily constructed.

When the rate conversion of the signal is not needed particularly hence the sampling frequency of the color difference data signal I remains at $f_{sI}$ which equals $4f_{sc}$ the provision of the re-sampling circuit 6I may not be required. In this case, the pre-filter 5I operates as a band filter.

FIG. 8 illustrates the receiving side of the transmitter 10 and interpolation filters 18I and 18Q which have different filter characteristics $F_{3I}$ and $F_{3Q}$ for the respective color difference data signals $I_4$ and $Q_4$.

Figure 10A:
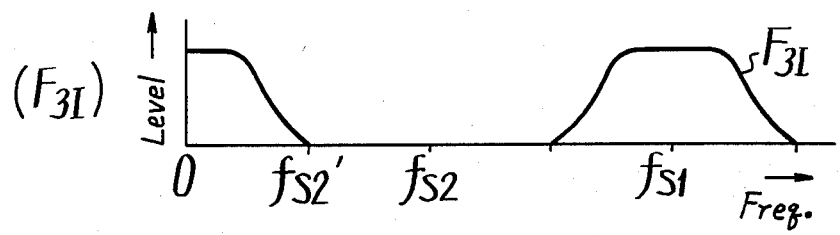
FIGS. 10A through 10E comprise diagrams for explaining and illustrating the frequency spectrums in the invention.
Figure 10B:
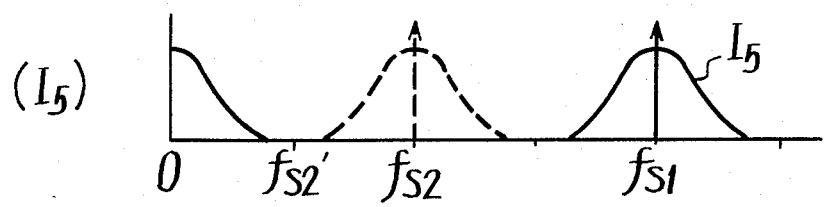
Figure 10C:
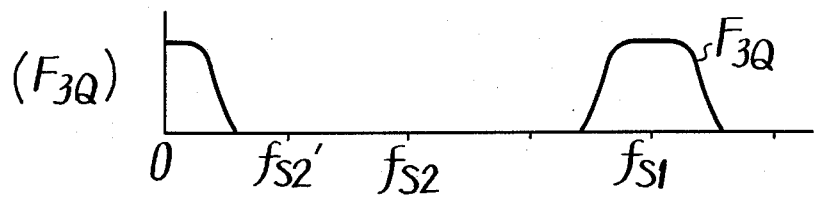
Figure 10D:
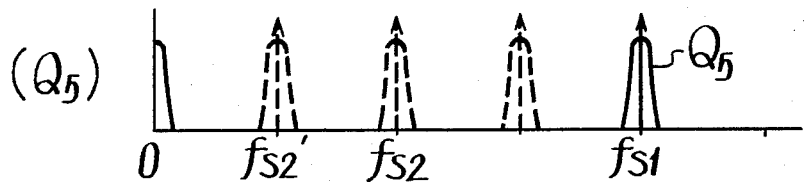
Figure 10E:
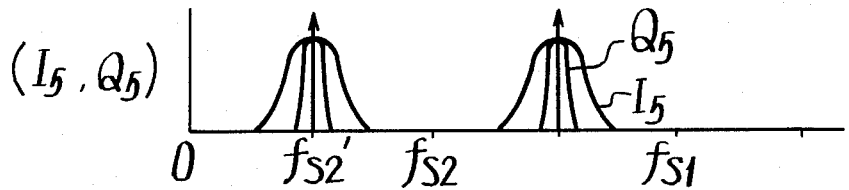

The interpolation filter 18I operates at a clock frequency of $f_{s2}$ which is obtained from terminal 19 and a clock frequency $f_{s1}$ obtained from terminal 20 and it has the filter characteristic $F_{3I}$ illustrated in FIG. 10A. Consequently, it produces the color difference data signal $I_5$ from which the unnecessary signal components illustrated by dotted line are eliminated as illustrated in FIG. 10B. The interpolation filter 18Q operates at a clock frequency $f_{s2}'$ which is supplied at terminal 19' and with the clock signal $f_{s1}$ supplied at terminal 20 and which includes the filter characteristic $F_{3Q}$ illustrated in FIG. 10C. Thus, at the output of the interpolation filter 18Q, there will appear a color difference data signal $Q_5$ in which the unnecessary signal component illustrated by a dotted line is eliminated as shown in FIG. 10D. The luminance data signal Y and the color difference data signals $I_5$ and $Q_5$ are supplied to the digital encoder 21 which produces at its output terminal 23 the digitized composite color video signal. Each of the color difference data signals $I_5$ and $Q_5$ at the output of the digital encoder 21 will have a frequency distribution as illustrated in FIG. 10E.

With this embodiment, in order to prevent the aliasing noise from occurring, the digital filters 5I and 5Q are provided at the stage prior to the re-sampling operation so as to limit the bands widths of the color difference data initially. But if the signals R, G and B supplied to the input terminals 1R, 1G and 1B are limited in band width, it is possible to omit the digital filters 5I and 5Q. For example, if CCDs (charge coupled devices) are utilized as the solid state imagers for producing the signals R, G and B and the CCDs are arranged such that the spatial sampling phase varies by one-half of the arranging pitches of the picture elements in the horizontal direction between the CCDs for the G signal and the other CCDs limiting of the band width can be accomplished. This method for eliminating the aliasing noise is called spatial offsetting technique and is disclosed in U.S. Pat. No. 4,069,501 which issued on Jan. 17, 1978 which was reissued on Nov. 17, 1981 as Re 30,800. The output side band obtained from the CCD chip for providing the green color signal and the output side bands obtained from the CCD chips for providing the red and blue color signals will have opposite phases and when these signals are matrixed so as to form the luminance signal, the unnecessary components will be cancelled from each other so as to eliminate the aliasing noise.

As will be understood from the descriptions of the embodiments described so far, since during re-sampling operation of the signal, the color difference data are supplied to the digital filters used for limiting the band width after their sampling rates ($4f_{sc}$) have been decreased up to the original processing rate divided by an integer, the decrease of the driving clock frequency of the digital filter becomes possible and the ratio $f_c/f_s$ can be made large and this will result in simplification of the construction of the digital filters.

Also, when the sampling rate is converted, a proper sampling rate can be selected in response to the band width of the signal to be transmitted.

While in the foregoing embodiments of the invention, the signals I and Q are used as a color difference data signals, the invention is not limited to the above signals I and Q. It is also possible to employ signals $R-Y/1.14$ and $B-Y/2.03$ and in this case, each of the signal band pass is limited to 0.8 MHz.

Although the invention has been described with respect to preferred embodiments, it is not to be so limited as changes and modifications can be made which are within the full intended scope of the invention as defined by the appended claims.

I claim as my invention:

1. A color video signal processing apparatus which is supplied with a luminance data signal and first and second color difference data signals which are digitized at a first sampling frequency and are formed by a matrix, characterized in that at least one of said first and second color difference data signals is sampled in a resampler at a second sampling frequency divided by an integer of said first sampling frequency, a digital filter for limiting the band width of the sampled output of said resampler to a predetermined band width, and said means combining said luminance data signal and said first and second color difference data signals whose band widths have been limited, wherein said color difference signal which is sampled at said second sampling frequency includes at least a Q signal component, wherein prior to being sampled at said second sampling frequency, a prefilter receives said color difference signal so as to prevent aliasing noise from being caused during the sampling operation.

2. A color video signal processing apparatus as cited in claim 1, wherein the sampling rates of said first and second sampling frequencies are 2 to 1.

3. A color video signal processing apparatus as cited in claim 1, wherein said first and second color difference signals are color signal-I and -Q components and the sampling rates of said first and second color difference signals are selected such that the sampling rates for the color signal I component is faster than that for the color signal Q component.

4. A color video signal processing apparatus as cited in claim 1, wherein said color difference signals sampled at said second sampling frequency are R−Y and B−Y signals.

5. A color video signal means comprising, means for producing a digital luminance signal and first and second color difference data signal, first and second digital filters respectively receiving said first and second color difference data signals and said filters driven at the same first frequency, and first and second re-samplers respectively receiving the outputs of said first and second digital filters and driven at a second frequency which is said first frequency divided by an integer, includes third and fourth digital filters which are driven at said second frequency and respectively receive the outputs of said first and second re-samplers, and comprising a digital encoder which receives said digital luminance signal, and first and second interpolation filters which are each driven at said first and second frequencies and respectively receive the outputs of said third and fourth digital filters and supplying inputs to said digital encoder.

6. A color video signal means according to claim 5 wherein said integer is an integer other than one.

7. A color video signal means comprising, means for producing a digital luminance signal and first and second color difference data signals, first and second digital filters respectively receiving said first and second color difference data signals and said filters driven at a first frequency, first and second re-samplers respectively receiving the outputs of said first and second digital filters and driven at a second frequency which is said first frequency divided by an integer and a third digital filter receiving the output of said first digital filter and driven at said second frequency, including a first delay line driven at said first frequency and said luminance signal supplied thereto and a second delay line driven at said second frequency and receiving the output of said second re-sampler, wherein said integer is an integer other than one, and including a digital encoder which receives said digital luminance signal, and third and fourth digital filters driven at said first and second frequencies and respectively receiving the outputs of said second delay line and said third digital filter.

* * * * *